United States Patent
McDaniel et al.

(10) Patent No.: US 6,713,572 B2
(45) Date of Patent: Mar. 30, 2004

(54) ETHYLENE COPOLYMERIZATION PROCESS

(75) Inventors: Max P. McDaniel, Bartlesville, OK (US); Elizabeth A. Benham, Bartlesville, OK (US)

(73) Assignee: Phillips Petroleum Company, Bartlesville, OK (US)

(*) Notice: Subject to any disclaimer, the term of this patent is extended or adjusted under 35 U.S.C. 154(b) by 0 days.

(21) Appl. No.: 10/281,915

(22) Filed: Oct. 28, 2002

(65) Prior Publication Data

US 2003/0139542 A1 Jul. 24, 2003

Related U.S. Application Data

(63) Continuation of application No. 09/061,741, filed on Apr. 16, 1998, now abandoned, which is a continuation of application No. 07/915,562, filed on Jul. 20, 1992, now abandoned, which is a continuation-in-part of application No. 07/594,268, filed on Oct. 9, 1990, now abandoned.

(51) Int. Cl.$^7$ .................................................. C08F 2/06
(52) U.S. Cl. ............... 526/64; 526/348.2; 526/348; 526/125.1; 526/159; 526/904; 526/123.1; 502/103
(58) Field of Search .................... 526/348.2, 348, 526/123.1, 125.1, 159, 904, 64; 502/103

(56) References Cited

U.S. PATENT DOCUMENTS

| | | | |
|---|---|---|---|
| 4,325,837 A | * | 4/1982 | Capshew et al. ....... 252/429 B |
| 4,330,433 A | | 5/1982 | Wristers |
| 4,422,956 A | | 12/1983 | Arzoumanidis et al. |
| 4,481,301 A | * | 11/1984 | Nowlin et al. ............. 502/104 |
| 4,605,638 A | | 8/1986 | Nowlin et al. |
| 4,740,550 A | | 4/1988 | Foster |
| 6,197,899 B1 | | 3/2001 | Mitchell et al. |

FOREIGN PATENT DOCUMENTS

EP 0 480 375 A2 4/1992

* cited by examiner

*Primary Examiner*—Ling-Siu Choi
(74) *Attorney, Agent, or Firm*—Kilpatrick Stockton LLP

(57) ABSTRACT

A process as disclosed for producing a low density polyethylene using a particle form polymerization process and a titanium-containing catalyst wherein the ratio of comonomer to ethylene is at least about 1:1 and the titanium-containing catalyst is a special catalyst which has been pretreated with an organometallic reducing agent.

58 Claims, No Drawings

US 6,713,572 B2

ETHYLENE COPOLYMERIZATION PROCESS

This application is a continuation application of U.S. patent application Ser. No. 09/061,741 filed Apr. 16, 1998 now abandoned, which is a continuation application of U.S. patent application Ser. No. 07/915,562 filed Jul. 20, 1992 now abandoned, which is also a continuation-in-part of U.S. patent application Ser. No. 07/594,268 filed Oct. 9, 1990 now abandoned, all of which are incorporated herein in their entirety by reference.

FIELD OF THE INVENTION

The present invention relates to the polymerization of ethylene. In one aspect, the present invention relates to a process for preparing an ethylene copolymer having a density of about 0.93 g/mL or less. In another aspect, the present invention relates to a slurry type copolymerization of ethylene which produces a low density copolymer. Still another aspect of the present invention relates to ethylene copolymerization using a continuous loop-type reactor.

BACKGROUND OF THE INVENTION

Various techniques for polymerizing ethylene are known. Examples include high pressure free radical polymerization, solution polymerization, gas phase polymerization, and slurry polymerization, sometimes referred to also as particle form polymerization. It is known that the density of the polyethylene can be varied by incorporating certain amounts of higher alpha-olefins during the polymerization. While the high pressure free radical type polymerization is capable of producing copolymers having densities of 0.93 g/mL and below, ethylene copolymers, referred to as linear low density polyethylene, can also be produced by copolymerizing ethylene in the presence of suitable catalysts. One technique of forming linear low density polyethylenes involves gas phase polymerization. Such processes have been found to be particularly useful for producing low density narrow molecular weight polymer that is particularly desirable for producing films. Using the particle form process in conjunction with a chromium-containing catalyst, it is also possible to make a low density polymer that is useful for the production of films; however, those polymers generally have a broader molecular weight and are not quite as clear as those produced catalytically using gas phase. Attempts have been made in the past to produce low density polyethylene in a particle form process using a titanium-containing catalyst; however, it was observed that the comonomer incorporation was generally not adequate to reduce the density to the level often desired. Generally, in order to produce lower density copolymer, it has been necessary to use much higher comonomer levels with the titanium catalysts. This results in more comonomers that must be flashed or recycled. For 1-hexene, the higher levels are also found to result in fluff swelling and reactor fouling in particle form polymerizations. To counteract that, generally lower polymerization temperatures have been employed. However, lowering the polymerization temperature lowers the rate at which the comonomer is incorporated. There is, therefore, a need for a method which allows for the copolymerization to be carried out at higher temperatures.

An object of the present invention is to provide a method for the particle form polymerization of ethylene to produce a low density polyethylene using a titanium based catalyst.

Still another object of the present invention is to provide a particle form polymerization of ethylene that is capable of yielding a low density polyethylene while using a minimum of organoaluminum cocatalyst.

Still another object of the present invention is to provide a process in which particle form copolymerization can be conducted at higher temperatures with reduced reactor fouling.

Other aspects, objects, and advantages of the present invention will be apparent to those skilled in the art having the benefit of this disclosure.

SUMMARY OF THE INVENTION

In accordance with the present invention there is provided a process for preparing an ethylene copolymer having a density of about 0.93 g/mL or less in a particle form polymerization process using a titanium-containing catalyst. The process comprises contacting ethylene and at least one higher alpha-olefin in a liquid diluent with a catalyst and a cocatalyst under particle form polymerization conditions wherein the molar ratio of the comonomer to ethylene is at least about 1:1 and wherein the titanium-containing catalyst is prepared by contacting a titanium alkoxide and a magnesium dihalide in a liquid to obtain a solution, contacting the solution with a precipitating agent selected from organoaluminum compounds to obtain a solid, contacting the solid with an olefin to form a prepolymerized solid, contacting the prepolymerized solid with titanium tetrachloride, contacting the resulting solid with an orgenometallic reducing agent, and washing that resulting solid with a hydrocarbon to remove soluble material and result in a washed solid which is said catalyst.

DETAILED DESCRIPTION OF THE INVENTION

The general conditions used in particle form polymerization are well known in the art. Such processes can be carried out in a batch or continuous mode. A particularly desirable method for carrying out particle form polymerizations involve the use of continuous loop-type reactors such as disclosed in U.S. Pat. No. 3,152,872 and U.S. Pat. No. 4,424,341, the disclosures of which are incorporated herein by reference. In such processes, the polymerization conditions can be varied by changing the catalyst feed rate, the temperature, the monomer feed rate, the hydrogen feed rate, and the like.

The present invention requires the employment of a specially prepared catalyst. The preparation of the catalyst is described in EPC Published Application 480,375. The catalyst is prepared by contacting reactants comprising a titanium alkoxide and a magnesium dihalide in a suitable liquid to form a solution. The resulting solution is then contacted with a suitable precipitating agent and the resulting solid is contacted with an olefin to produce a prepolymerized solid. The prepolymerized solid is then contacted with titanium tetrachloride and then the thus resulting solid is contacted with an organometallic reducing agent. The solid resulting after that step is washed with a hydrocarbon to remove soluble material.

The invention is particularly useful when applied to a titanium-containing catalyst containing olefin prepolymer of the type disclosed in U.S. Pat. No. 4,325,837, the disclosure of which is incorporated herein by reference. Such catalysts are prepared by reacting a titanium alkoxide with a magnesium dihalide in a suitable liquid to form a solution. The resulting solution is then contacted with a suitable precipitating agent and the resulting solid is contacted with titanium tetrachloride either before or after prepolymer of an olefin is added to the solid.

Examples of the titanium alkoxides include the titanium tetraalkoxides in which the alkyl groups contain 1 to about 10 carbon atoms each. Some specific examples include titanium tetramethoxide, titanium dimethoxide diethoxide, titanium tetraethoxide, titanium tetra-n-butoxide, titanium tetrahexyloxide, titanium tetradecyloxide, titanium tetraisopropoxide, and titanium cyclohexyloxide.

The magnesium halide is preferably selected from magnesium chlorides.

The titanium alkoxide and the magnesium dihalide can be combined in any suitable liquid. Examples include substantially anhydrous organic liquids such as n-pentane, n-hexane, n-heptane, methylcyclohexane, toluene, xylenes, and the like.

The molar ratio of the transition metal compound to the metal halide can be selected over a relatively broad range. Generally, the molar ratio is within the range of about 10 to 1 to about 1 to 10, preferably between about 3 to 1 to about 0.5 to 2; however, more often the molar ratios are within the range of about 2 to 1 to about 1 to 2.

Generally, it is necessary to heat the liquid mixture to obtain a solution. Generally, the components are mixed at a temperature in the range of about 15° C. to about 150° C. The mixing can be carried out at atmospheric pressure or at higher pressures.

The time required for heating the two components is any suitable time which will result in a solution. Generally, this would be a time within the range of about 5 minutes to about 10 hours. Following the heating operation, the resulting solution can be filtered to remove any undissolved material or extraneous solid, if desired.

The precipitating agent is selected from organoaluminum compounds having the formula $R_mAlZ_{3-m}$ wherein R is a hydrocarbyl group having 1 to 8 carbon atoms, Z is a halogen, hydrogen or hydrocarbyl group having 1 to 8 carbons, and m is a number in the range of 1–3. Some specific examples include dihydrocarbylaluminum monohalides, monohydrocarbylaluminum dihalides, hydrocarbylaluminum sesqueialides, and the like. The currently preferred precipitating agents are organoaluminum halides such as, for example, ethylaluminum sesquichloride and ethylaluminum dichloride.

The amount of precipitating agent employed can be selected over a relatively broad range depending upon the particular activities desired. Generally, the molar ratio of the transition metal of the titanium-containing solid component to the precipitating agent is within the range of from about 10 to 1 to about 1 to 10 and more generally within the range of about 2 to 1 to about 1 to 3.

In especially preferred embodiments the catalyst contains an amount of prepolymer sufficient to improve the particle size of the catalyst and ultimately the size of the polymer particles produced in a polymerization reaction.

One way of forming prepolymer involves conducting the precipitation in the presence of an aliphatic mono-1-olefin. Another technique involves contacting the precipitated solid with an aliphatic mono-1-olefin under suitable conditions to form prepolymer. This can be done either before or after the solid is treated with titanium tetrachloride. Examples of olefins which can be used for forming prepolymer include ethylene, propylene, 1-butene, 1-pentene, 1-hexene, 1-heptene, 4-methyl-1-pentene, 1-heptene, 1-octene, and the like and mixtures of one or more thereof. The weight of prepolymer based on the total weight, of the prepolymerized catalyst is generally in the range of from about 1 to 90 wt. %, more preferably about 1 to about 20 wt. %, and still more preferably about 1 to about 15 wt. %.

The relative ratios of the titanium tetrachloride to the solid can vary over a wide range; however, as a general rule, the weight ratio of the titanium tetrachloride to the prepolymerized or unprepolymerized solid would generally be within the range of about 10 to 1 to about 1 to 10, more generally about 7 to 1 to about 1 to 4.

The pretreatment of the titanium-containing catalyst with an organometallic reducing agent prior to the introduction of the catalyst into the polymerization zone is preferably carried out in a substantially inert liquid, generally a hydrocarbon. The term organometallic reducing agent as used herein refers to generally those same type of organometallic reducing agents that have been used in the past as cocatalysts for transition metal based olefin polymerization catalysts systems. A preferred type of reducing agent includes organoaluminum compounds such as triethylaluminum, trimethylaluminum, diethylaluminum chloride, ethylaluminum dichloride, ethylaluminum sesquichloride, methylaluminum sesquichloride, triisopropylaluminum, dimethylaluminum chloride, tridecylaluminum, trieicosylaluminum, tricyclohexylaluminum, triphenylaluminum, diethylaluminum chloride, ethylaluminum dichloride, ethylaluminum sesquichloride, methylaluminum sesquichloride, triisopropylaluminum, dimethylaluminum chloride, tridecylaluminum, trieicosylaluminum, tricyclohexylaluminum, triphenylaluminum, 2-methylpentyldiethylaluminum, triisoprenylaluminum, methylaluminum dibromide, ethylaluminum diiodide, isobutylaluminum dichloride, dodecylaluminum dibromide, dimethylaluminum bromide, diisopropylaluminum chloride, methyl-n-propylaluminum bromide, di-n-octylaluminum bromide, diphenylaluminum chloride, dicyclohexylaluminum bromide, methylaluminum sesquibromide, ethylaluminum sesquiiodide, and the like and mixtures thereof. Triethylaluminum is currently preferred.

Preferably conditions are employed in all the catalyst preparation steps to minimize the presence of deleterious amounts of oxygen and water. The presence of small amounts of water and/or oxygen during the formation of solution from the titanium alkoxide and the magnesium halide can produce benefits. The contacting of the reducing agent and the catalyst precursor can be carried out over a broad range of temperature conditions. Typically, the contacting would be conducted at a temperature in the range of about 15° C. to about 150° C., more typically, about 20° C. to about 100° C. After the contacting the mother liquor is generally decanted and the resulting solids washed several times with a suitable liquid solvent such as a hydrocarbon, to remove hydrocarbon soluble materials.

The amount of organometallic reducing agent employed can vary over a broad range. Excess organometallic reducing agent can be employed. Generally the organometallic reducing agent would be used in an amount such that the molar ratio of the reducing agent to the titanium in the catalyst precursor is in the range of about 0.01:1 to about 10:1, more preferably about 0.02:1 to about 3:1.

The resulting catalyst may if desired be mixed with a particulate diluent such as, for example, silica, silica-alumina, silica-titania, magnesium dichloride, magnesium oxide, polyethylene, polypropylene, and poly(phenylene sulfide), prior to the use of the catalyst in a polymerization process. The weight ratio of the particulate diluent to the catalyst can be varied over a wide range. Typically, the weight ratio of the particulate diluent to the catalyst is generally within the range of about 100 to 1 to about 1 to 100, or more often in the range of about 20 to 1 to about 2 to 1. The use of a particulate diluent such as fumed silica has been found to be particularly effective in facilitating the controlled charging of the catalyst to the reactor.

Any suitable comonomer can be employed to form the ethylene copolymer. Typically alpha-olefin comonomers having 3 to 10 carbon atoms per molecule would be employed. Some particular examples include 1-butene, 1-hexene, 1-pentene, 4-methyl-1-pentene, and the like. Generally, if propylene is employed as a comonomer, it is preferable to employ at least one other alpha-olefin comonomer having at least 4 carbon atoms in an amount of at least about one percent of the weight of the polymer. Generally it is desirable for the reaction to be conducted under conditions such that the copolymer is comprised of at least about 80 mole percent ethylene.

In the particle form polymerization, the temperature and pressure conditions are selected to assure that the polymer can be recovered as discreet particles. Typically this involves temperatures in the range of about 60° C. to about 95° C., more generally about 75° C. to about 90° C. In a continuous loop particle form process, a particularly preferred embodiment involves a reactor temperature in the range of about 80° C. to about 85° C. and a pressure of about 600 psi. Generally any suitable liquid polymerization diluent can be employed. It is currently preferred to use hydrocarbons, for example isobutane or propane as the liquid diluent.

The molar ratio of the comonomer to ethylene can vary over a wide range depending upon the particular results desired. Typically the molar ratio of comonomer to ethylene would be in the range of about 1:1 to about 2:1, more preferably about 1.2:1 to about 1.5:1. In a continuous loop type particle form polymerization, it is currently desirable for the comonomer to be employed in an amount equal to about 40 to about 70 weight percent of the ethylene feed, still more preferably about 45 to about 55 weight percent. In such a continuous process, it is also desirable to control catalyst addition, temperature, and the like so as to have a flash gas containing about 1.5 to about 3 mole percent ethylene, more preferably about 2.4 to about 2.7 mole percent ethylene, at a flash temperature in the range of 120° C. to 175° C.

While it is considered that any of the cocatalysts that have been used in the past with similar titanium-based catalysts can be employed, the currently preferred cocatalysts are trialkylaluminums, especially triethylaluminum. A particularly preferred embodiment of the present invention involves carrying out the polymerization in a liquid polymerization diluent containing not more than about 30 ppm triethylaluminum cocatalyst.

The present invention is particularly useful for preparing an ethylene copolymer having a low density and a narrower molecular weight distribution and better clarity than is generally obtained when a similar copolymer is prepared using a chromium-based catalyst system in a particle form polymerization.

A further understanding of the present invention and its objects and advantages will be provided by the following examples:

EXAMPLE I

Several copolymerization runs were carried out in a pilot plant scale loop reactor using 1-hexene and ethylene at various molar ratios. The polymerization liquid diluent was isobutane. The catalyst that was employed was prepared by contacting titanium tetraethoxide and a magnesium dihalide in a liquid hydrocarbon to obtain a solution, the solution was contacted with ethylaluminum dichloride to obtain a solid, the solid was then contacted with an olefin under suitable conditions to form a prepolymerized solid, the prepolymerized solid was then contacted with titanium tetrachloride, the thus resulting solid was then contacted with triethylaluminum, the solid resulting after that treatment was then washed with a hydrocarbon to remove soluble material to result in a washed solid which is the catalyst employed. The TEA treated catalyst was mixed with a Cabosil fine fumed silica before being fed to the reactor. The pilot plant polymerization reactor was an 87 liter, 15.2 cm diameter loop reactor. A summary of the polymerization variables and the results obtained is provided in Table I.

TABLE I

| Run | 21 | 22 | 23 |
|---|---|---|---|
| Reactor Temp., ° F. | 184 | 184 | 185 |
| $C_2^=$, mol % in Flash Gas | 2.60 | 2.52 | 2.62 |
| $C_6^{-1}$, mol % in Flash Gas | 3.91 | 3.21 | 3.30 |
| $C_6^{-1}/C_2$ | 1.50 | 1.27 | 1.26 |
| $C_6^{-1}$, wt % of $C_2^=$Feed | 49.0 | 50.6 | 51.5 |
| $H_2$, mol % | 0.08 | 0.06 | 0.05 |
| $H_2/C_2$ | 0.03 | 0.02 | 0.02 |
| TEA, ppm in i-$C_4$ | 22 | 24 | 21.5 |
| Catalyst Productivity | 29,000 | 31,500 | 29,500 |
| MI, fluff | 0.97 | 1.10 | 0.70 |
| HLMI, fluff | 29.5 | 35.5 | 18.8 |
| HLMI/MI, fluff | 30 | 32 | 27 |
| Density, fluff | .926 | .921 | .921 |
| MI, pellet | 0.76 | 0.90 | 0.49 |
| HLMI, pellet | 27.9 | 32.5 | 19.9 |
| HLMI/MI, pellet | 37 | 36 | 41 |
| Density, pellet | .928 | .924 | .924 |
| MI drop-off, % | 21.6 | 18.2 | 30.0 |
| HLMI drop-off, % | 5.4 | 8.5 | +5.6 |
| Flex. Mod., MPa | 563 | 466 | 444 |

The data in Table I demonstrates that by using high comonomer to ethylene ratios, it is possible to obtain copolymers having densities lower than 0.93 g/mL. Even though the cocatalyst level was very low, i.e. in the range of 21.5 to 22 parts per million, the catalyst productivity was still within a commercially acceptable range.

Swelling of the polymer was not a problem during these polymerizations. The Jerjuson volume was about 65% solids, which is near normal for such particle form polymerizations. The produced polymer fluff was not fine nor sticky. Fouling of the reactor was not a problem. This is in contrast to the results obtained in earlier pilot plant polymerizations which were conducted using a non-TEA pretreated titanium catalyst at even lower temperatures.

EXAMPLE II

The low density polymers produced from the polymerization runs of Example I were each formed into films using a 1.5 inch Davis Standard screw extruder with an annular blow film die of 4 inch outside diameter and a 0.037 inch die gap. The blowup ratio was 4:1. The frost line was 14 inches in height, the melt temperature was 220–240° C. and the screw speed was in the range of 30 to 75 rpm. The same process was also used to form films from a commercial gas phase linear low density polyethylene and a chromium particle form linear low density polyethylene product produced using a chromium catalyst. A comparison of resin properties and film properties is set forth in Table II.

TABLE II

| Run | 1 | 2 | 3 | Gas Phase LLDPE | CrO LLDPE |
|---|---|---|---|---|---|
| MI, pellet | .76 | .90 | .49 | .94 | .14 |
| HLMI, pellet | 28 | 33 | 20 | — | 15 |
| HLMI/MI | 37 | 36 | 41 | — | 107 |
| Density, pellet | .928 | .924 | .924 | .920 | .926 |
| R&D Film Results | 21.6 | 18.3 | 24.4 | 12.6 | 48.5 |
| Haze, % | | | | | |
| Dart, g | 158 | 209 | >700 | >700 | 490 |
| Spencer, J | 0.44 | 0.7 | 1.6 | NB | 1.7 |
| Tear, MD, g | 290 | 360 | 300 | 650 | 120 |
| Tear, TD, g | 680 | 790 | 540 | 850 | 830 |
| Gel/ft$^2$ | 19 | 10 | 5 | 2 | 4 |

NB = No Break

The haze values were measured with a Gardner LX211 Hazegard® system using the same conditions for all the films.

The data in Table II illustrates that the impact strength of the inventive copolymers was quite good. The molecular weight distribution as reflected by HLMI/MI is much narrower than that of the chromium produced polyethylene copolymer. Further the inventive copolymers resulted in films which were clearer than the chromium-produced copolymer. Although the haze of the inventive polymers was not quite equal to the commercial gas phase linear low density polyethylene, the difference might be due to the fact that the inventive polyethylene copolymers were not quite as low in density as the gas phase coplymer.

All the inventive copolymers processed very well. No processing aid was required. Accordingly, the inventive resins are considered to be competitive with other linear low density polyethylene now being commercialized.

What is claimed is:

1. A process for preparing an ethylene copolymer having a density of 0.93 g/mL or less in a particle form polymerization process using a titanium-containing catalyst, the process comprising contacting ethylene and at least one higher alpha-olefin in a liquid diluent consisting essentially of isobutane with the titanium-containing catalyst and a cocatalyst in a continuous loop reactor under particle form polymerization conditions wherein, the molar ratio of the comonomer to ethylene is at least about 1:1, wherein the polymerization is conducted at a temperature in the range of 80° C. to about 90° C. and wherein the titanium-containing catalyst is prepared by contacting a titanium alkoxide and magnesium dihalide in a liquid to obtain a solution, contacting the solution with a precipitating agent selected from organoaluminum compounds to obtain a solid, contacting the solid with titanium tetrachloride before or after a prepolymerization step to result in a prepolymerized catalyst precursor, contacting the resulting prepolymerized catalyst precursor with an organometallic reducing agent to produce a resulting solid, washing the resulting solid with a hydrocarbon to remove soluble material to result in a washed solid which is the titanium-containing catalyst.

2. A process according to claim 1, wherein the molar ratio of comonomer to ethylene is in the range of about 1:1 to about 2:1.

3. A process according to claim 2, wherein the comonomer consists essentially of an alpha-olefin having 4 to 10 carbon atoms.

4. A process according to claim 3, wherein the comonomer consists essentially of 1-hexene.

5. A process according to claim 4, wherein the cocatalyst consists essentially of triethylaluminum.

6. A process according to claim 5, wherein the triethylaluminum cocatalyst is present in an amount such that the level of the triethylaluminum relative to the diluent does not exceed 30 ppm.

7. A process according to claim 6, wherein the molar ratio of the comonomer to the ethylene is in the range of about 1.2:1 to about 1.5:1.

8. A process according to claim 7, wherein the polymerization is conducted at a temperature in the range of about 80° C. to about 85° C.

9. A process according to claim 8, wherein the titanium-containing catalyst is prepared by combining titanium tetraethoxide and magnesium chloride in a solvent to produce a solution, ethylaluminum dichloride is used to precipitate a solid from the solution, and triethylaluminum is used as the reducing agent for treating the prepolymerized catalyst precursor.

10. A process according to claim 9, wherein the process is operated to produce a flash gas having about 1.5 to 3 mole percent ethylene.

11. A process according to claim 10, wherein the feed rate of the hexene is about 40 to about 70 weight percent of the feed rate of the ethylene.

12. A process according to claim 9, wherein the catalyst is used in combination with fumed silica.

13. A process according to claim 4, wherein the catalyst is prepared by combining titanium tetraethoxide and magnesium chloride in a solvent to produce a solution, ethylaluminum dichloride is used to precipitate a solid from the solution, and triethylaluminum is used as the reducing agent for treating the prepolymerized catalyst precursor.

14. A process for preparing an ethylene copolymer having a density of 0.93 g/mL, or less in a particle form polymerization which results in a processable fluff of desirable particle size, the process comprising contacting ethylene and 1-hexene in a liquid diluent consisting essentially of isobutane with a particulate titanium-containing catalyst and a cocatalyst consisting essentially of triethylaluminum in a loop reactor under particle form polymerization conditions, wherein the molar ratio of the comonomer to ethylene is at least about 1:1, wherein the polymerization temperature is in the range of about 80° C. to about 90° C, wherein the level of triethylaluminum in the cocatalyst relative to the diluent does not exceed 30 ppm, further characterized by the fact that the particulate titanium-containing catalyst is prepared by contacting a titanium alkoxide and magnesium dihalide in a liquid to obtain a solution, contacting the solution with a precipitating agent selected from organoaluminum compounds to obtain a solid, contacting the solid with titanium tetrachloride before or after a prepolymerization step to result in a prepolymerized catalyst precursor, contacting the resulting prepolymerized catalyst precursor with an organometallic reducing agent to produce a resulting solid, washing the resulting solid with a hydrocarbon to remove soluble material to result in a washed solid which is the particulate titanium-containing catalyst.

15. A process according to claim 14, wherein the particulate titanium-containing catalyst is prepared by combining titanium tetraethoxide and magnesium chloride in a solvent to produce a solution, ethylaluminum dichloride is used to precipitate a solid from the solution, and triethylaluminum is used as the reducing agent for treating the prepolymerized catalyst precursor.

16. A process according to claim 1, wherein the comonomer comprises an alpha-olefin having 4 to 10 carbon atoms.

17. A process according to claim 1, wherein the comonomer comprises an alpha-olefin having 3 to 10 carbon atoms.

18. A process according to claim 1, wherein the comonomer is 1-hexene.

19. A process according to claim 1, wherein the cocatalyst comprises a trialkylaluminum.

20. A process according to claim 1, wherein the cocatalyst comprises triethylaluminum.

21. A process according to claim 20, wherein the triethylaluminum cocatalyst is present in an amount such that the level of the triethylaluminum relative to the diluent does not exceed 30 ppm.

22. A process according to claim 1, wherein the molar ratio of the comonomer to the ethylene is in the range of about 1.2:1 to about 1.5:1.

23. A process according to claim 1, wherein the polymerization is conducted at a temperature in the range of about 80° C. to about 85° C.

24. A process according to claim 1, wherein the titanium alkoxide comprises titanium tetraethoxide.

25. A process according to claim 1, wherein the titanium alkoxide comprises titanium alkoxides in which the alkyl groups contain 1 to about 10 carbon atoms each.

26. A process according to claim 1, wherein the magnesium dihalide comprises magnesium chloride.

27. A process according to claim 1, wherein the organometallic reducing agent is selected from triethylaluminum, trimethylaluminum, diethylaluminum chloride, ethylaluminum dichloride, ethylaluminum sesquichloride, methylaluminum sesquichloride, triisopropylaluminum, dimethylaluminum chloride, tridecylaluminum, trieicosylaluminum, tricyclohexylaluminum, triphenylaluminum, diethylaluminum chloride, ethylaluminum dichloride, ethylaluminum sesquichloride, methylaluminum sesquichloride, triisopropylaluminum, dimethylaluminum chloride, tridecylaluminum, trieicosylaluminum, tricyclohexylaluminum, triphenylaluminum, 2-methylpentyldiethylaluminum, triisoprenylaluminum, methylaluminum dibromide, ethylaluminum diiodide, isobutylaluminum dichloride, dodecylaluminum dibromide, dimethylaluminum bromide, diisopropylaluminum chloride, methyl-n-propylaluminum bromide, di-n-octylaluminum bromide, diphenylaluminum chloride, dicyclohexylaluminum bromide, methylaluminum sesquibromide, ethylaluminum sesquiiodide, or mixtures thereof.

28. A process according to claim 1, wherein the organometallic reducing agent comprises triethylaluminum.

29. A process according to claim 1, wherein the precipitating agent comprises an organoaluminum compound having the formula $R_mAlZ_{3-m}$, wherein R is a hydrocarbyl group having 1 to 8 carbon atoms; Z is a halogen, hydrogen or hydrocarbyl group having 1 to 8 carbons; and m is a number in the range of 1–3.

30. A process according to claim 1, wherein the catalyst is prepared by combining titanium tetraethoxide and magnesium chloride in a solvent to produce a solution, ethylaluminum dichloride is used to precipitate a solid from the solution, and triethylaluminum is used as the reducing agent for treating the prepolymerized catalyst precursor.

31. A process according to claim 1, wherein the process is operated to produce a flash gas having about 1.5 to 3 mole percent ethylene.

32. A process according to claim 18, wherein the feed rate of the hexene is about 40 to about 70 weight percent of the feed rate of the ethylene.

33. A process according to claim 1, wherein the catalyst is used in combination with fumed silica.

34. A process according to claim 1, wherein the catalyst is used in combination with a particulate diluent.

35. A process according to claim 1, wherein the particulate diluent is selected from silica, silica-alumina, silica-titania, magnesium dichloride, magnesium oxide, polyethylene, polypropylene, and poly(phenylene sulfide), or fumed silica.

36. A process according to claim 1, wherein the precipitation is conducted in the presence of an aliphatic mono-1-olefin.

37. A process according to claim 1, wherein the prepolymerization step comprises contacting the precipitated solid with an aliphatic mono-1-olefin under polymerization conditions to form the prepolymerized catalyst precursor.

38. A process according to claim 37, wherein the aliphatic mono-1-olefin is selected from ethylene, propylene, 1-butene, 1-pentene, 1-hexene, 1-heptene, 4-methyl-1-pentene, 1-heptene, 1-octene, or mixtures of one or more thereof.

39. A process according to claim 18, wherein the catalyst is prepared by combining titanium tetraethoxide and magnesium chloride in a solvent to produce a solution, ethylaluminum dichloride is used to precipitate a solid from the solution, and triethylaluminum is used as the reducing agent for treating the prepolymerized catalyst precursor.

40. A process according to claim 14, wherein the titanium alkoxide comprises titanium tetraethoxide.

41. A process according to claim 14, wherein the magnesium dihalide comprises magnesium chloride.

42. A process according to claim 14, wherein the organometallic reducing agent comprises triethylaluminum.

43. A process for preparing an ethylene copolymer having a density of 0.93 g/mL or less in a particle form polymerization process using a titanium-containing catalyst, the process comprising contacting ethylene and at least one higher alpha-olefin in a liquid diluent with the titanium-containing catalyst and a cocatalyst in a continuous reactor under particle form polymerization conditions, wherein the molar ratio of the comonomer to ethylene is at least about 1:1, wherein the polymerization is conducted at a temperature in the range of about 60° C. to about 95° C. and wherein the titanium-containing catalyst is prepared by contacting a titanium alkoxide and magnesium dihalide in a liquid to obtain a solution, contacting the solution with a precipitating agent selected from organoaluminum compounds to obtain a solid, contacting the solid with titanium tetrachloride before or after a prepolymerization step to result in a prepolymerized catalyst precursor, contacting the resulting prepolymerized catalyst precursor with an organometallic reducing agent to produce a resulting solid, washing the resulting solid with a hydrocarbon to remove soluble material to result in a washed solid which is the titanium-containing catalyst.

44. A process according to claim 43, wherein the comonomer comprises an alpha-olefin having 3 to 10 carbon atoms.

45. A process according to claim 43, wherein the cocatalyst comprises a trialkylaluminum.

46. A process according to claim 45, wherein the trialkylaluminum cocatalyst is present in an amount such that the level of the trialkylaluminum relative to the diluent does not exceed 30 ppm.

47. A process according to claim 43, wherein the molar ratio of the comonomer to the ethylene is in the range of about 1.2:1 to about 1.5:1.

48. A process according to claim 43, wherein the titanium alkoxide comprises titanium alkoxides in which the alkyl groups contain 1 to about 10 carbon atoms each.

49. A process according to claim 43, wherein the magnesium dihalide comprises magnesium chloride.

50. A process according to claim 43, wherein the organometallic reducing agent is selected from triethylaluminum, trimethylaluminum, diethylaluminum chloride, ethylaluminum dichloride, ethylaluminum sesquichloride, methylaluminum sesquichloride, triisopropylaluminum, dimethylaluminum chloride, tridecylaluminum, trieicosylaluminum, tricyclohexylaluminum, triphenylaluminum, diethylaluminum chloride, ethylaluminum dichloride, ethylaluminum sesquichloride, methylaluminum sesquichloride, triisopropylaluminum, dimethylaluminum chloride, tridecylaluminum, trieicosylaluminum, tricyclohexylaluminum, triphenylaluminum, 2-methylpentyldiethylaluminum, triisoprenylaluminum, methylaluminum dibromide, ethylaluminum diiodide, isobutylaluminum dichloride, dodecylaluminum dibromide, dimethylaluminum bromide, diisopropylaluminum chloride, methyl-n-propylaluminum bromide, di-n-octylaluminum bromide, diphenylaluminum chloride, dicyclohexylaluminum bromide, methylaluminum sesquibromide, ethylaluminum sesquiiodide, or mixtures thereof.

51. A process according to claim 43, wherein the precipitating agent comprises an organoaluminum compound having the formula $R_mAlZ_{3-m}$, wherein R is a hydrocarbyl group having 1 to 8 carbon atoms; Z is a halogen, hydrogen or hydrocarbyl group having 1 to 8 carbons; and m is a number in the range of 1–3.

52. A process according to claim 43, wherein the process is operated to produce a flash gas having about 1.5 to 3 mole percent ethylene.

53. A process according to claim 43, wherein the catalyst is used in combination with a particulate diluent.

54. A process according to claim 43, wherein the particulate diluent is selected from silica, silica-alumina, silica-titania, magnesium dichloride, magnesium oxide, polyethylene, polypropylene, and poly(phenylene sulfide), or fumed silica.

55. A process according to claim 43, wherein the precipitation is conducted in the presence of an aliphatic mono-1-olefin.

56. A process according to claim 43, wherein the prepolymerization step comprises contacting the precipitated solid with an aliphatic mono-1-olefin under polymerization conditions to form the prepolymerized catalyst precursor.

57. A process according to claim 56, wherein the aliphatic mono-1-olefin is selected from ethylene, propylene, 1-butene, 1-pentene, 1-hexene, 1-heptene, 4-methyl-1-pentene, 1-heptene, 1-octene, or mixtures of one or more thereof.

58. A process according to claim 43, wherein the liquid diluent is isobutane or propane.

* * * * *